United States Patent [19]
Ball

[11] Patent Number: 5,748,263
[45] Date of Patent: May 5, 1998

[54] SYSTEM FOR AUTOMATICALLY PRODUCING INFRARED CONTROL SIGNALS

[76] Inventor: Bradley E. Ball, 4912 Frieze Cir., Taylorsville, Utah 84118

[21] Appl. No.: 399,591

[22] Filed: Mar. 7, 1995

[51] Int. Cl.[6] .................................................. H04N 5/44
[52] U.S. Cl. ......................... 348/734; 348/473; 348/547; 348/696; 348/907
[58] Field of Search .................................... 348/734, 907, 348/632, 634, 635, 691, 695, 696, 512, 529, 548, 517, 465, 473; 358/908, 312; 360/14.1; H04N 5/44

[56] References Cited

U.S. PATENT DOCUMENTS

| | | | |
|---|---|---|---|
| 4,853,782 | 8/1989 | Asano et al. | 348/695 |
| 4,908,707 | 3/1990 | Kinghorn | 348/473 |
| 4,979,047 | 12/1990 | Wine | 348/632 |
| 5,151,788 | 9/1992 | Blum | 348/907 |
| 5,343,251 | 8/1994 | Nafeh | 348/907 |

FOREIGN PATENT DOCUMENTS

| | | | |
|---|---|---|---|
| 3184484 | 8/1991 | Japan | 358/908 |
| 9407334 | 3/1994 | WIPO | 348/465 |

*Primary Examiner*—John K. Peng
*Assistant Examiner*—Jeffrey S. Murrell

[57] ABSTRACT

A system for automatically editing commercial messages within a television broadcast. Connection of the apparatus to a video system is simplified over the prior art by requiring only one video input connection. The video input of the apparatus can be connected to the video output jack of either a television receiver or a VCR. The apparatus determines the beginning of a commercial message by detecting the absence of video information, above a dynamic bias level, for the duration of two consecutive composite video fields. The end of a commercial message is determined by an intelligent decision making process. This process takes advantage of movement characteristics inherent in video commercial advertisements along with the type of event being recorded. Based on the event type, a dynamically updated run time list is accessed to compare the current commercial run time against high percentage historical run times. This information along with the movement characteristics are used to more accurately determine the end of a series of commercials and the resumption of programming. A dynamically adjusted time-out timer is used as a backup to insure recording is resumed if an erroneous decision is arrived at. This process dramatically reduces the amount of programming lost while editing.

10 Claims, 17 Drawing Sheets

SYSTEM FOR AUTOMATICALLY PRODUCING INFRARED CONTROL SIGNALS

BACKGROUND OF THE INVENTION

The present invention pertains to the field of video and audio equipment and systems, and in particular to the automatic remote control of a television receiver, video cassette recorder (VCR), or other device capable of being controlled by an infrared remote control device, based on the detection of certain patterns of the received television video signal.

It is often desirable to take an action when a commercial message is broadcasted during the course of a television program. Such actions include pausing a VCR which is recording the television program, changing the television receiver to another channel, or muting the sound of the television. A number of different systems have been proposed for taking an action upon the detection of the beginning and ending of a commercial message, none offers the simplicity and flexibility of the present invention. While it is possible for a viewer or user to detect the beginning and ending of a commercial message and take some manual action, it is desirable to provide an automatic method for controlling a television receiver, VCR or other device.

Two separate distinguishing characteristics exist in the prior art. The first distinguishing characteristic is the technique used to detect the beginning of a commercial message. The second distinguishing characteristic is the action which then can be taken. United States Patents to Novak, U.S. Pat. Nos. 4,420,769 and 4,750,213 have proposed storing a digital signature developed from samples of various television signals. A sample of the current television signal being received is then compared to the library of stored signatures to attempt to recognize the particular program currently being received. It is doubtful that such a system can work effectively without developing a library for every possible commercial message or desired programming that might be received. Furthermore, since commercials and programming are constantly being added and deleted, this massive signature library would have to be constantly managed and updated to be effective.

Most prior art systems use some means to detect breaks in programming that often indicate the start of a commercial message or the resumption of a television program. Such breaks are often indicated by the absence of video or audio signals for a period of time. U.S. Pat. No. Johnston et al., 4,390,904 Johnston, et al. describes a detector that determines a program break by the coincident absence of both video and audio signals. Utilizing two separate signals to improve the accuracy of determining a program break presents difficulties. The absence of a video signal during a program break may extend only for one or two television frames, each of which is only 1/30 of a second. A break in video signals, therefore, can be much shorter than breaks in audio signals which can occur during a pause between sentences or in other instances of silence in a television broadcast. Many false breaks in an audio signal would be detected if the time frame for a video signal break were employed, (e.g. 1/30 or 1/15 of a second). On the other hand, background noise in an audio signal, either introduced at the originating station or at the receiver, could prevent the detection of true audio breaks. U.S. Pat. No. 4,752,834 to Koombes employs a detection means based on examining both the audio and video signals. U.S. Pat. No. 4,750,052 to Poppy et al. also describes a "fade detector" based on examining both audio and video signals.

In prior art systems that detect a break in programming, the end of a commercial message or series of commercial messages is determined by measuring a time period slightly longer than the expected commercial message length (in many instances, 30 seconds). If another break in programming is detected before this initial time period has expired, a new time period is started. If no break in programming is detected before the end of any time period, it is assumed that the commercial messages have ended. It is important to note that the break in programming between the last commercial message and the resumption of a television program also starts a time period. Therefore the end of the commercial messages is not determined until after the actual resumption of a television program.

The second means for classifying the prior art is based upon the action to be performed when a commercial message is detected. In U.S. Pat. Nos. 4,918,531 to Johnson, and 4,979,047 to Wine the channels on a television receiver are changed in a predefined sequence when a commercial message is detected. This allows a viewer to see the programming on other channels. At the end of the commercial messages, the television receiver is returned to the original channel. Similarily in the patent to Novak, supra, an alternate signal source is selected during the time period of the commercial messages.

In U.S. Pat. No. 4,782,401 (as well as in Johnston et al., Poppy et al., and Koombes, supra.) the detection of a commercial message is used to control a VCR. In Johnston et al., a VCR is placed in a pause mode and stops recording during the commercial message (and also during a part of the resumed television program equal to the nominal length of a commercial). In Faerber et al., Poppy et al., and Koombes, the video tape in a VCR is rewound to a point at the start of the undesired recorded commercial. Upon resumption of the television program, the desired signal is taped over the commercial, thus eliminating it from that tape. In order to rewind a video tape to the beginning of a commercial message, a VCR must be capable of accurately positioning its tape to a specified location. This feature is not generally available on home VCRs. An alternative approach rewinds the video tape for a previously determined fixed period of time to approximate the length of the commercial message. Each VCR would require a different amount of time to rewind depending upon its speed.

SUMMARY OF THE INVENTION

It is the object of the present invention to allow a user to select the actions that the inventive device will perform at the start and end of a commercial message series (one or more consecutive commercial messages within a television program). The inventive device allows a user to select from various actions such as changing television channels, pausing a VCR, rewinding a video tape, or selecting an alternate video source.

The ability to select the action taken by the inventive device is achieved by allowing a user to program a command or sequence of commands to be transmitted to a television receiver, video cassette recorder, or any other device that can be controlled by an infrared remote control device. In the preferred embodiment, command sequences are programmed by a user. A command sequence is accessed when the beginning of a commercial message is detected and a command sequence is accessed at the end of a commercial message. For example, a first command sequence programmed by the user can place a VCR into its pause mode while recording a television program. A second command sequence programmed by the user can return the VCR to its normal recording mode to continue recording a television program.

As another example, a user could also program a command sequence to place a television in mute mode, so that the audio output is suppressed. A second command would restore the normal audio output at the end of the commercial message. A command sequence could be programmed to change the channel of a television to another television broadcast during the duration of the commercial messages. A second command sequence could return the television to the original television broadcast at the end of the commercial messages.

If the video input to the present inventive device is from the output of a VCR that is playing a previously-recorded program, the first command sequence can be used to fast-forward the video tape over commercial messages. The second command sequence could be used to return the VCR to its play mode at the end of the commercial messages. As will be seen, the present invention can automatically generate any infrared command sequence that the remote control device is capable of generating.

It is an object of the present invention to improve the reliability of a method for detecting the end of a series of commercial messages. This is accomplished with the implementation of an intelligent decision making process. This process takes advantage of the movement characteristics of commercials in the first six seconds after a blank frame, along with the type of event being recorded. Based on the event type, a dynamically updated historical run-time list is accessed to compare the current commercial run-time, against high percentage historical run-times. This information along with the movement characteristics are used to more accurately determine the end of a series of commercials and the resumption of programming. A dynamically adjusted timeout timer is used as a failsafe to insure recording is resumed if an erroneous decision is reached. This process dramatically reduces the amount of programming lost at the end of commercial messages.

It is also an object of the present invention to simplify the use of such an inventive device over the prior art. Simplification is achieved by using a microprocessor computer to replace most of the circuitry used in of prior art devices. The use of a microprocessor results in a device which is easier to construct, more flexible to use, and more adaptable to other functions; such as interfacing with the user.

It is also an object of the present invention to simplify the connection of the inventive device in a home audio-video system. In the preferred embodiment, the only connection required is a video signal input to the inventive device. The video input can be a signal commonly available from a VCR, a cable television input, or a television receiver. Because control of the television receiver, video cassette recorder, or other device is achieved by use of wireless infrared remote control signals, no additional connections are required.

These and other features of the invention will be more readily understood upon consideration of the attached drawings and of the following detailed description of those drawings and the preferred embodiments of the invention.

DETAILED DESCRIPTION OF THE INVENTION

Figure 1:
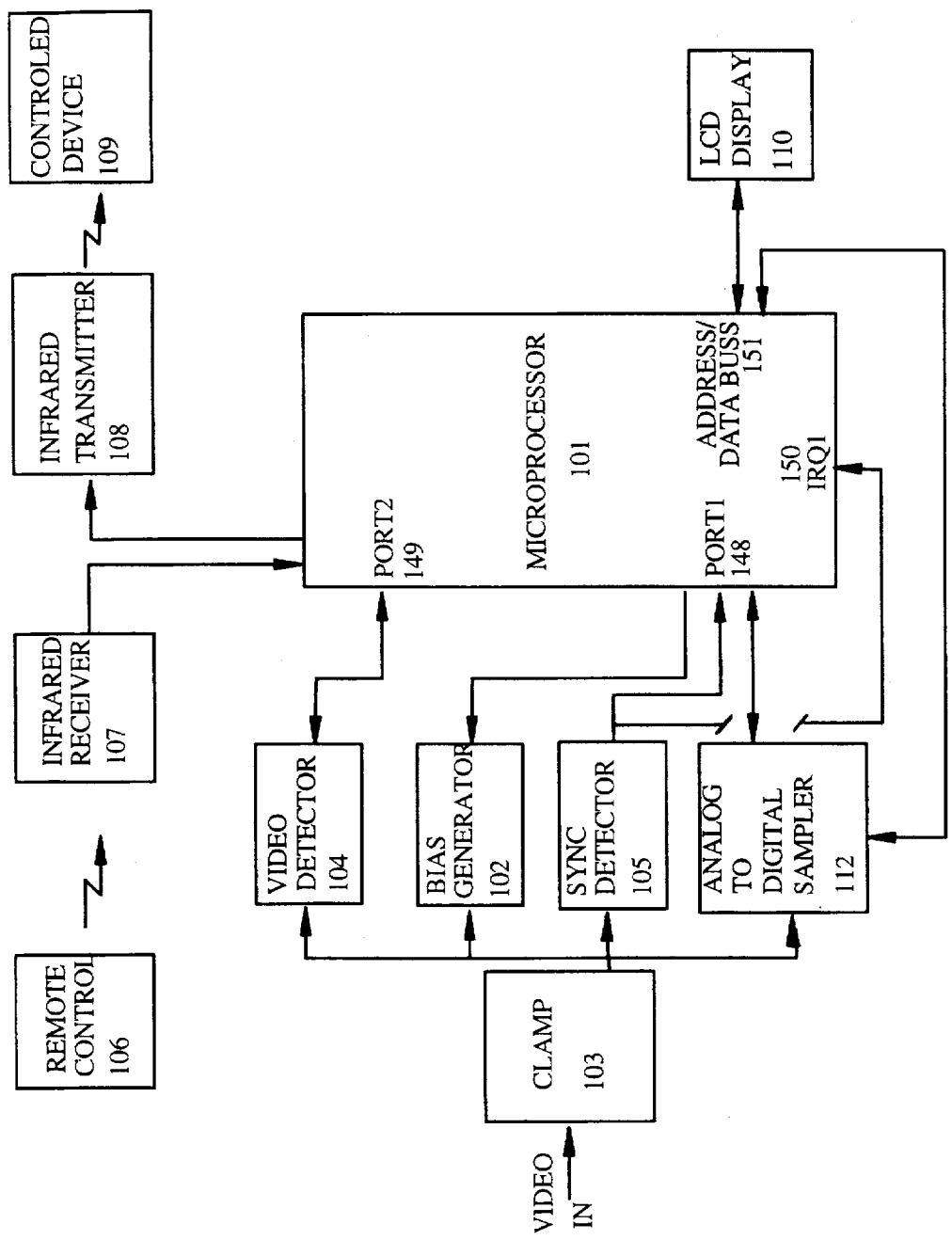
FIG. 1 is a block diagram depicting the preferred embodiment of the invention, an audio or video device which can be controlled by the invention, and a remote control device for programming the invention.

Referring to FIG. 1, depicted is a block diagram depicting the preferred embodiment of the invention. In the preferred embodiment a Microprocessor 101 including a First Port, 148 Second Port, 149 and Standard Address/Data Buss 151. A video input signal sent through a Clamp 103, establishes a direct current level for the video signal in the event that it has a value lower than a reference level.

The video signal is then applied to a Sync Detector 105 which separates the synchronizing information in a television signal from the video signal and produces a pulse output which is applied to an interrupt request (or IRQI) input 150 of Microprocessor 101. Said Sync Detector 105 also produces a pulse output which is applied to Port 1 of Microprocessor 101. Sampling this pulse at Port 1 indicates to said microprocessor whether a video signal is being received by the inventive device. A Video Detector 104 produces a digital signal output that is connected to said Second Port 2 of said Microprocessor 101. Said Video Detector 104 indicates that video information was detected since the last time said Video Detector 104 was armed by an output signal from said Second Port of Microprocessor 149. A Bias Generator 102 is enabled only after Microprocessor 101 receives a pulse from Sync Detector 105. Bias Generator 102 then samples the video signal to generate a DC bias for said Video Detector 104.

An Analog to Digital Sampling Circuit 112 generates a dynamic integral of said video signal for use by Microprocessor 101, and associated circuitry. This integral is used to help make a decision concerning the end of a commercial message.

Said Second Port 149 of said Microprocessor 101 also receives instructional input from an Infrared Receiver 107.

Said Infrared Receiver 107 is a receiving means which receives infrared remote control signals transmitted by a Remote Control Device 106. Said Remote Control Device 106 can be the conventional remote control device for a Controlled Device 109. Controlled devices can include televisions, VCRs or other electronic appliances or devices capable of receiving infrared signals. Said Second Port of Microprocessor 149 produces output signals which are sent to an Infrared Transmitter 108. Said Infrared Transmitter 108 is a transmitting means which produces infrared remote control signals that are received by said Controlled Device 109. The infrared remote control signals produced by said Infrared Transmitter 108 are adapted to transmit the same key characteristics (such as frequency and duration) as control signals produced by the Remote Control Device 106. This enables said IR Transmitter 108 to control said Controlled Device 109 in the same similar way that it is controlled by its conventional remote control device. Said Infrared Receiver 107 and said Infrared Transmitter 108 acting together are considered one embodiment of a signal means for producing an infrared signal. Said Address/Data Buss 151 of Microprocessor 101 is used to control and send data to LCD Display 110.

Figure 2:
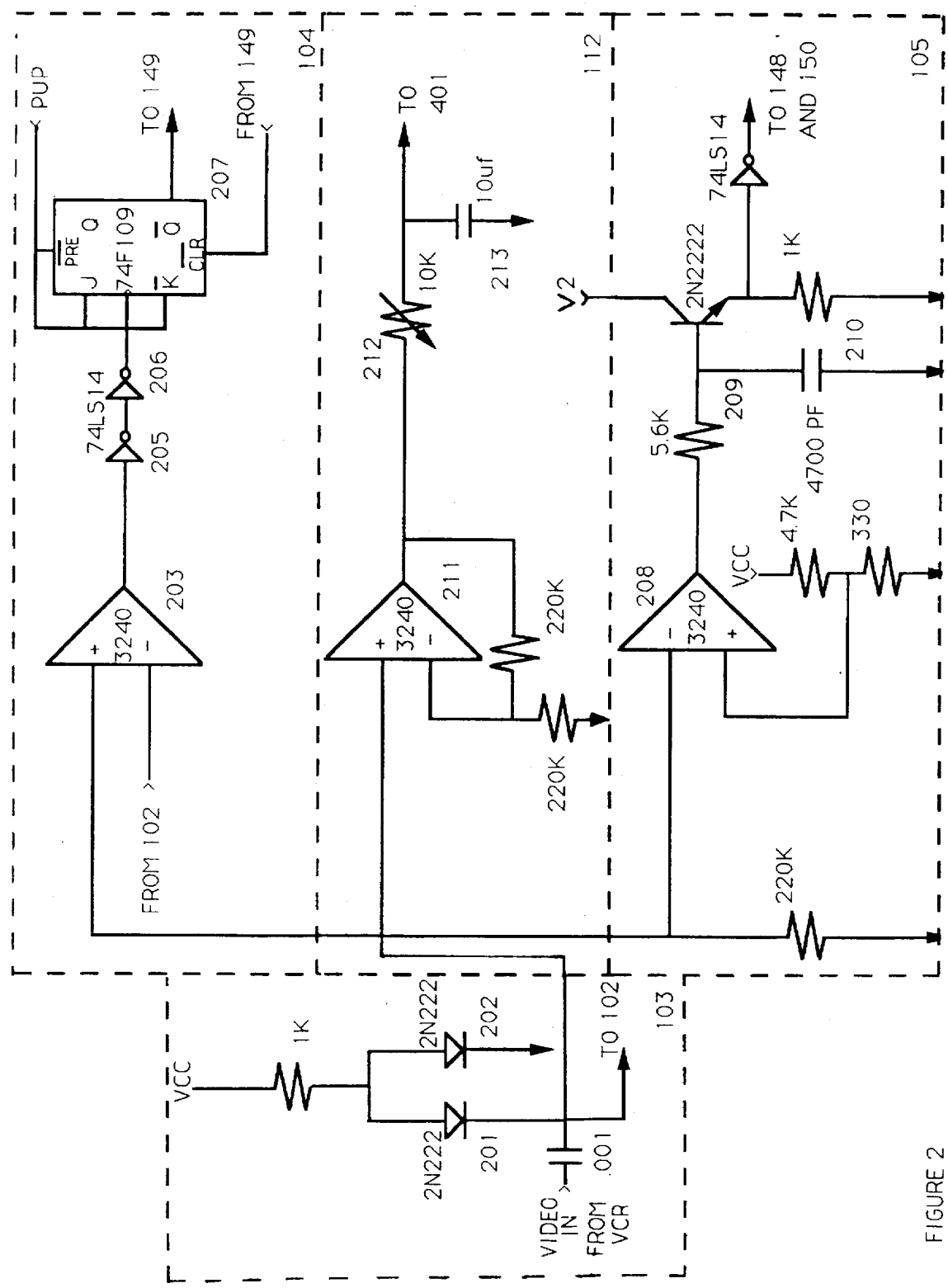
FIG. 2 depicts a schematic diagram of clamp, video detector, sync detector, and analog to digital sampling circuits.
Figure 3:
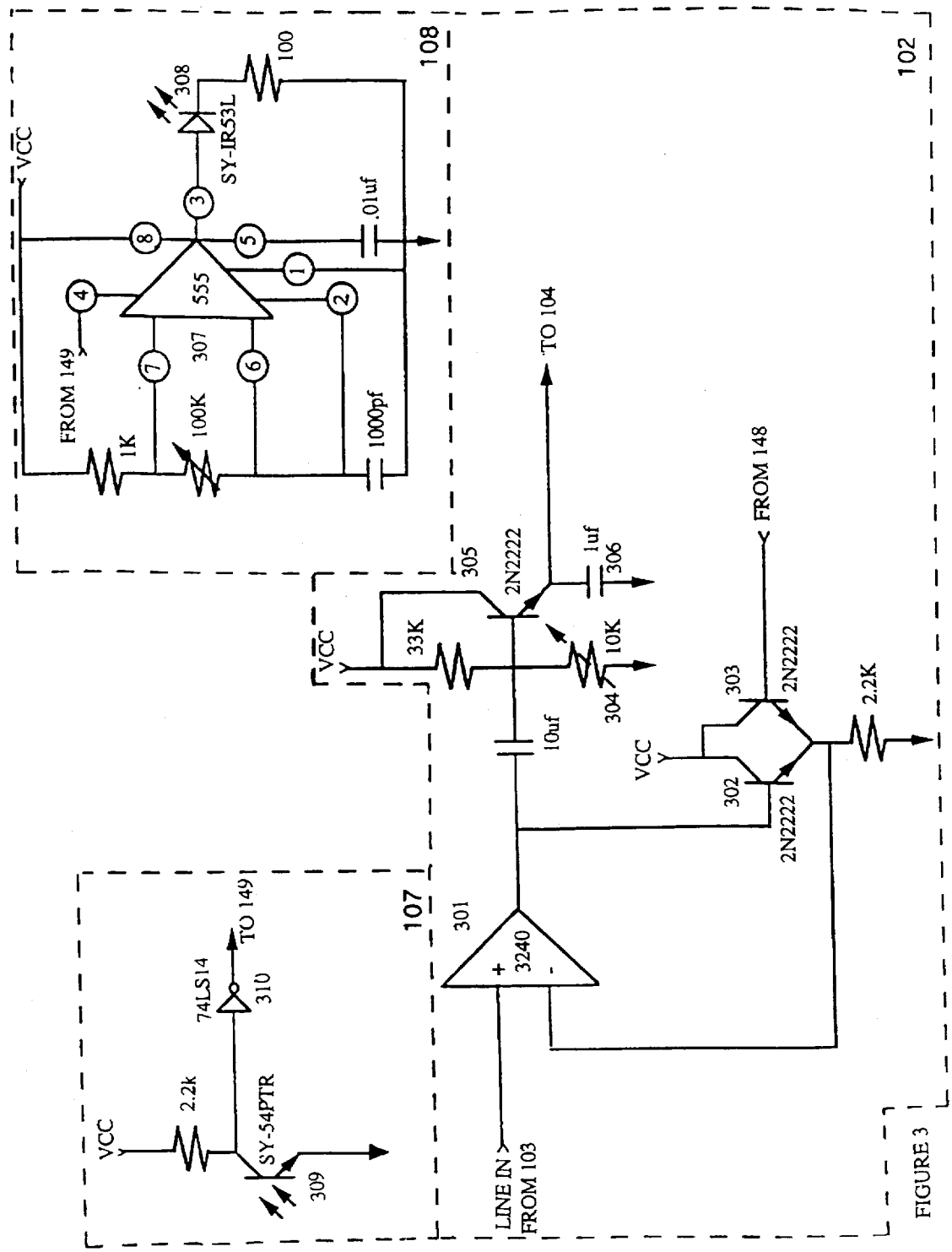
FIG. 3 depicts a schematic diagram of infrared receiver, infrared transmitter, and bias generator circuits.

FIG. 2 depicts electrical schematics for one implementation of said Clamp 103, said Video Detector 104, said Sync Detector 105, and said Analog to Digital Sampler 112. FIG. 3 depicts electrical schematics for one implementation of said Bias Generator 102, said IR Receiver 107 and said IR Transmitter 108. The aforementioned circuits are generally known to people skilled in the art of video circuit or television receiver design. Other circuits which provide a similar function could be substituted for the aforementioned circuits without departing from the invention.

Said Clamp 103 establishes a DC component for a video input signal, not claimed, that is close to a reference DC level. Diodes 201 and 202 are used to establish a direct current component of a video signal dose to the reference level supplied to said Diodes 201 and 202. The establishment of a direct current close to a reference level enables the device to make more accurate measurements of the video and sync components of the video input signal by said Video Detector 104, said Sync Detector 105, said Analog to Digital Sampler 112 and said Bias Generator 102.

Said Video Detector 104 is comprised of an Operational Amplifier 203 used to filter only the components of the video signal whose amplitudes are above the bias input from Bias Generator 102. Schmidt Triggers 205 and 206 are used to determine if the output of said Operational Amplifier 203 contains any video information. If the output from said Operational Amplifier 203 contains video information, said Schmidt Triggers Clock Flip-Flop 207 making its output "true." Said Flip-Flop 207 is cleared by a signal from Microprocessor 101 at the start of each new video field. If Flip-Flop 207 is "true," video information has been detected after it was reset by said Microprocessor 101. If Flip-Flop 207 remains "false" only a blank field has been received rather than video signal.

Figure 4:
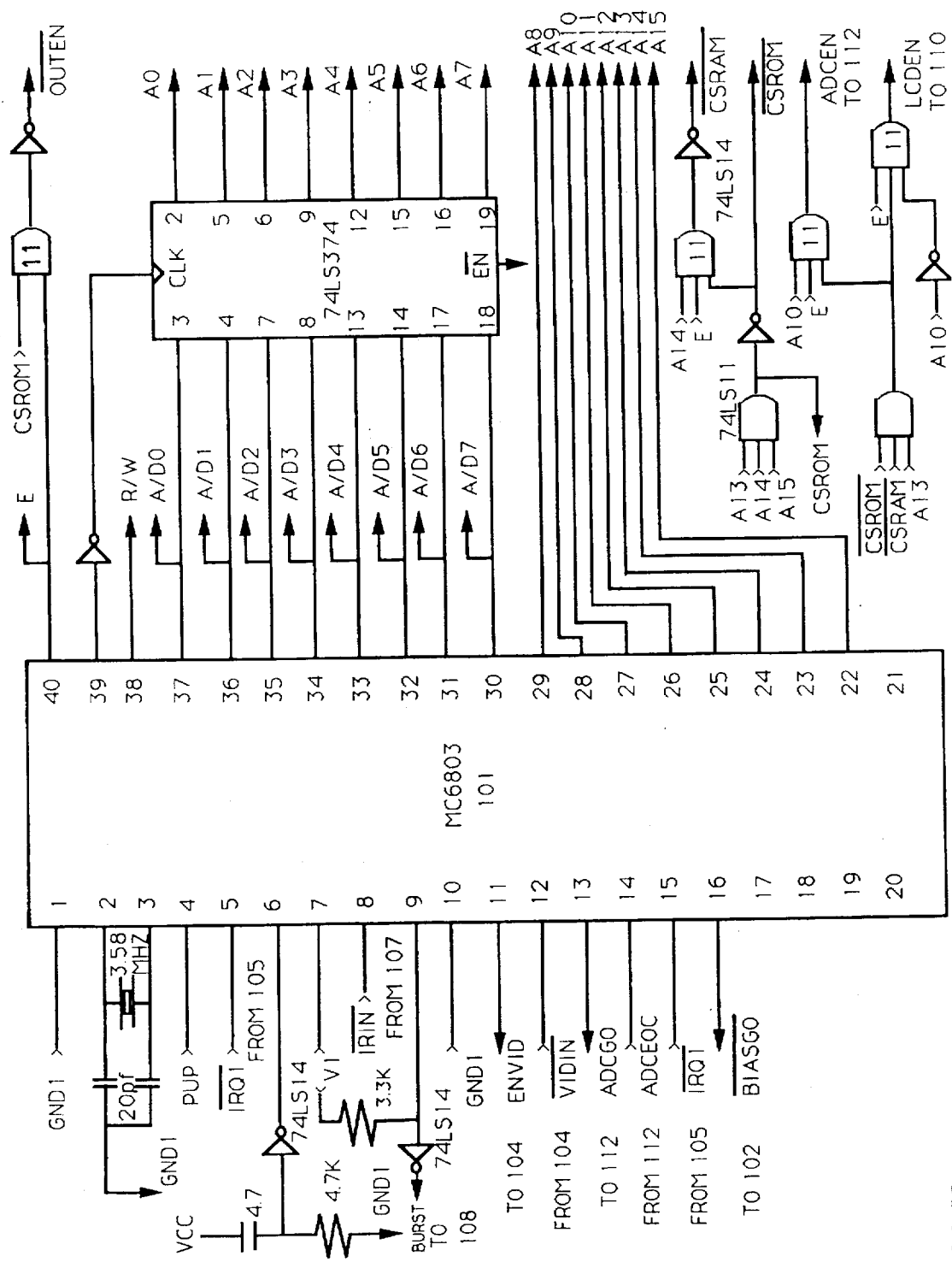
FIG. 4 depicts a schematic diagram showing the preferred embodiment of the microprocessor and control signals.
Figure 4A:
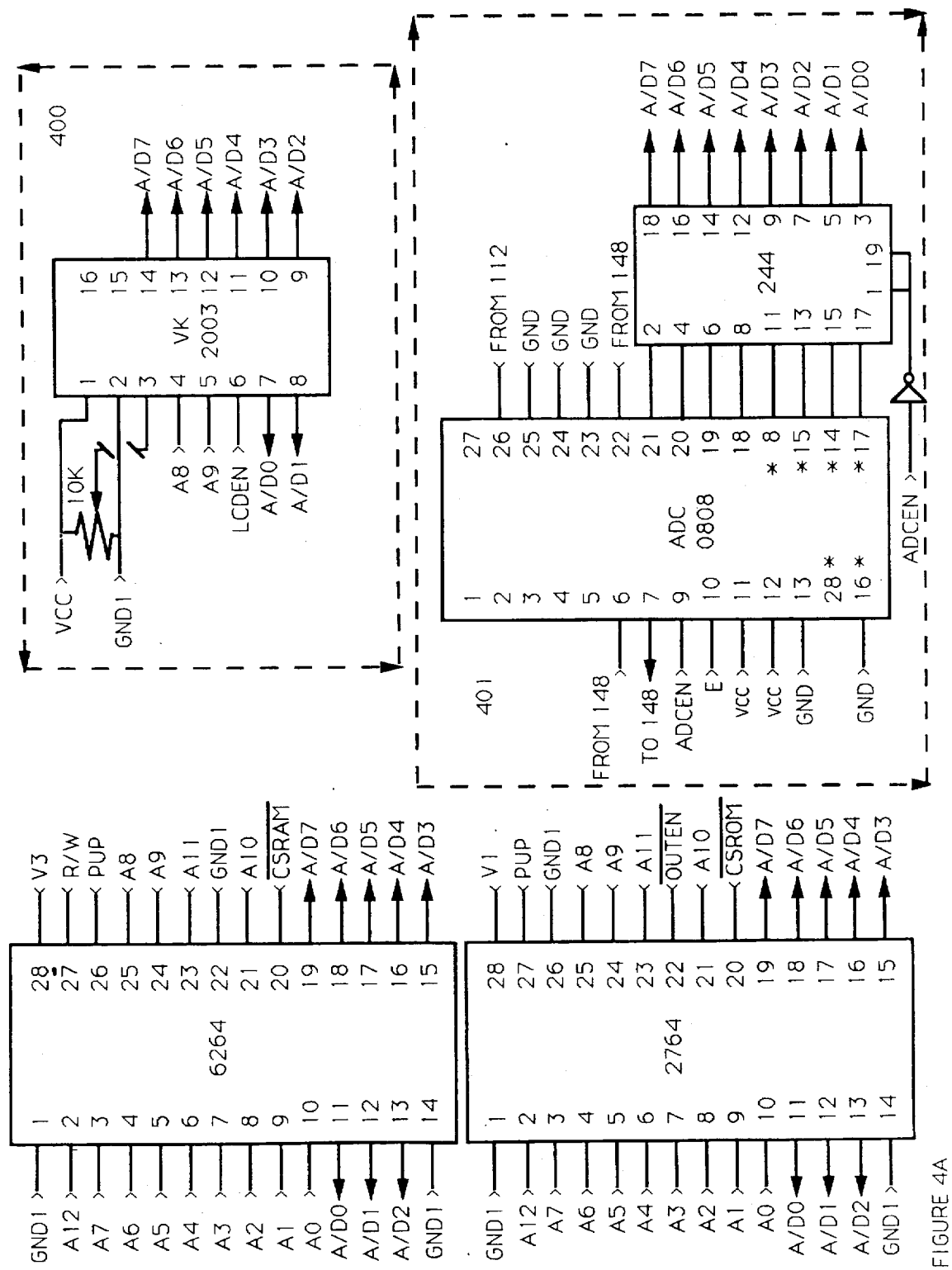
FIG. 4a depicts the RAM, ROM, analog to digital converter, and LCD display.

Said Sync Detector 105 is comprised of an Operational Amplifier 208 which compares the video signal to a reference level. Said Operational Amplifier 208 along with a Resistor 209 and Capacitor 210 form a low pass circuit that produces a pulse whenever a vertical sync pulse is present. A vertical sync pulse is included in television signals. The pulse from said Operational Amplifier 208 is sent to said interrupt request (IRQ) input 150 of Microprocessor 101, causing an interrupt to occur whenever a vertical sync pulse occurs. This pulse is also sampled at Port 1 148 of Microprocessor 101. If after a certain amount of time, the pulse level at 148 has not returned to an inactive high state, i.e. still looks like vertical sync is present, then this represents an abnormal or missing video signal. If the signal continues in this abnormal state then Microprocessor 101 halts the VCR and stops recording until the signal returns to normal. In this way the device provides a means for determining if a video signal has been lost. Said Analog to Digital Sampler 112 is comprised of an Operational Amplifier 211 which amplifies said video signal by two and sends it to a low pass integrator formed by Potentiometer 212 and Capacitor 213. The integrated value is sent to an Analog to Digital Converter 401 (FIG. 4a). Said Converter 401 is controlled by Microprocessor 101 through Port 1. Data is input to 101 via the Address/Data Buss 151.

Said Bias Generator 102 (FIG. 3) is comprised of an Operational Amplifier 301 which is either off or on depending on the value input to its negative terminal by Transistors 302 and 303. If the input from Microprocessor 101 to Transistor 303 is high then Operational Amplifier 301 receives a high voltage at its negative terminal and turns off. This effectively turns off any active driving signal to Transistor 305 and causes Capacitor 306 to hold its value. If the input from Microprocessor 101 to Transistor 303 is low, then 303 is turned off. This allows Transistor 302 to turn on, providing a feed back path to 301. This causes 301 to output a replica of the video signal value to Transistor 305. The sum of this voltage plus the voltage at 305 base, generated by 304, are then stored by Capacitor 306. This circuit is only enabled during a vertical sync pulse. In this way, the bias is generated according to the value of the serrations in the vertical sync pulse. The circuit is disabled at the end of vertical sync by Microprocessor 101. Said IR Transmitter 108 is comprised of a standard 555 Timer Circuit (307) and an Infra Red Transmitter Diode 308. Said Timer 307 operates as a square wave generator at a frequency approximating 36 KHZ. Said Microprocessor 101 supplies an enabling signal to said Timer 307 via Pin 4 (149). When enabled said timer outputs 36 KHZ continuous square wave cycles to Infra Red Diode 308 causing infra red signal to be transmitted. The duration of the transmission is determined by the on-time duration of the enabling signal from said Microprocessor 101. In this way, said Microprocessor 101 can control the "on" and "off" times of said Timer 307 and provides a way to transmit pulse code modulated infrared signals to a controllable device.

Said IR Receiver 107 is comprised of Infra Red Receiver Diode 309 and Schmidt Trigger 310. Infra red pulses are received by IR Diode 309 and coupled to said Microprocessor 101 via Schmidt Inverter 310. This provides a means for Microprocessor 101 to store infra red pulse commands from an IR controller such as 106 (FIG. 1).

Figure 5:
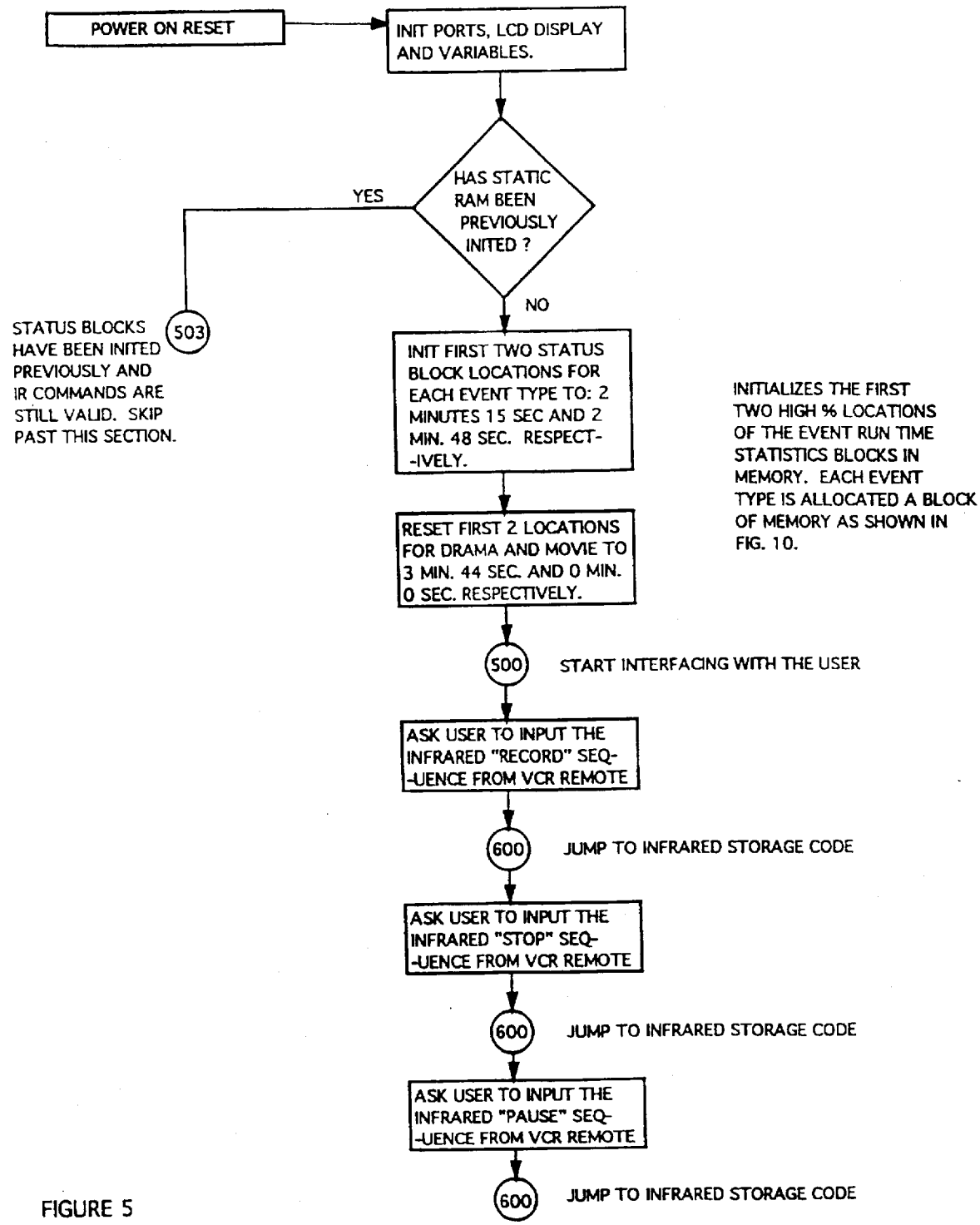
FIG. 5 depicts a flow diagram representing the steps taken to program the invention with the desired command sequences.
Figure 5A:
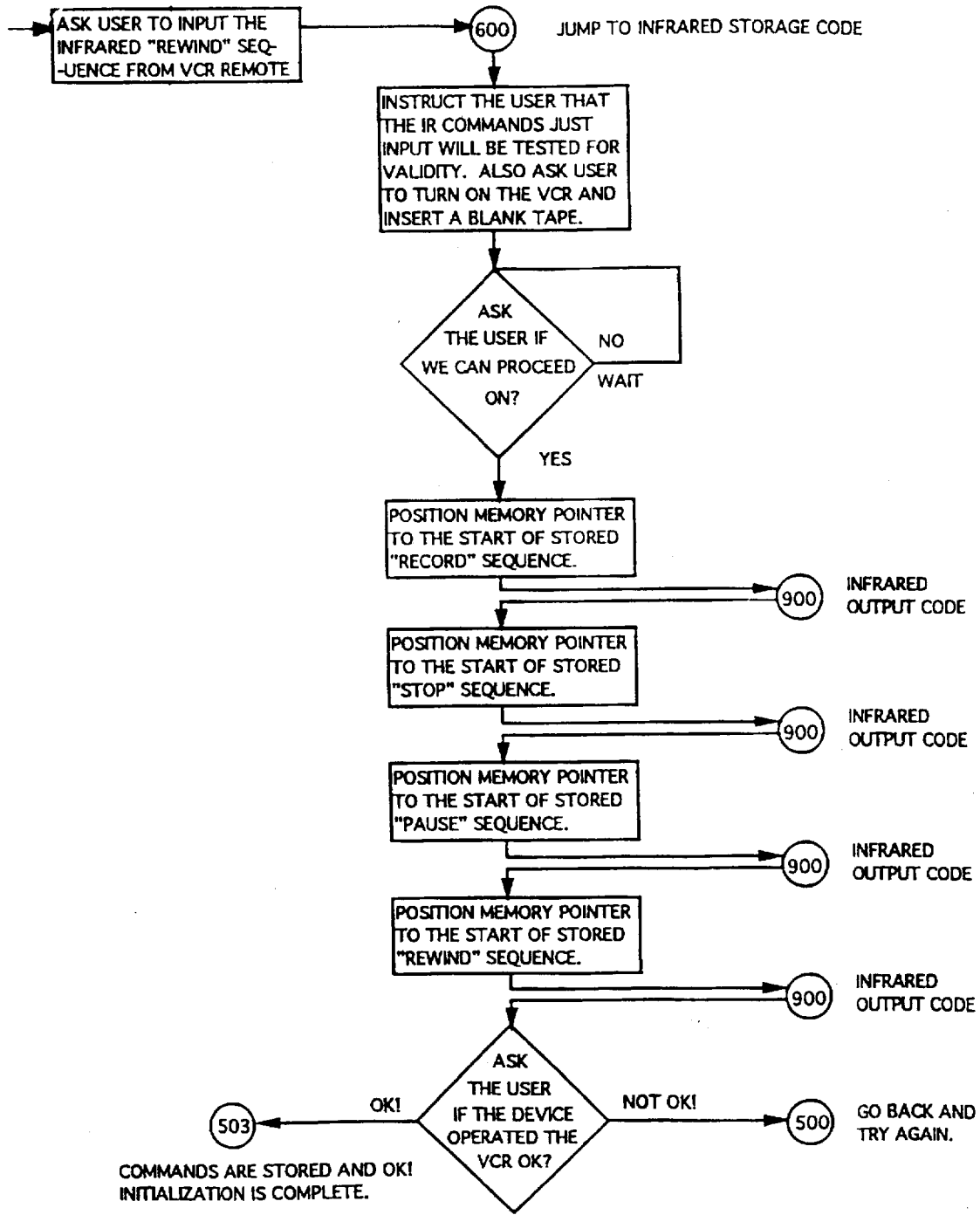
FIG. 5a depicts a flow diagram representing the steps taken to insure valid commands are learned from the remote control.
Figure 10:
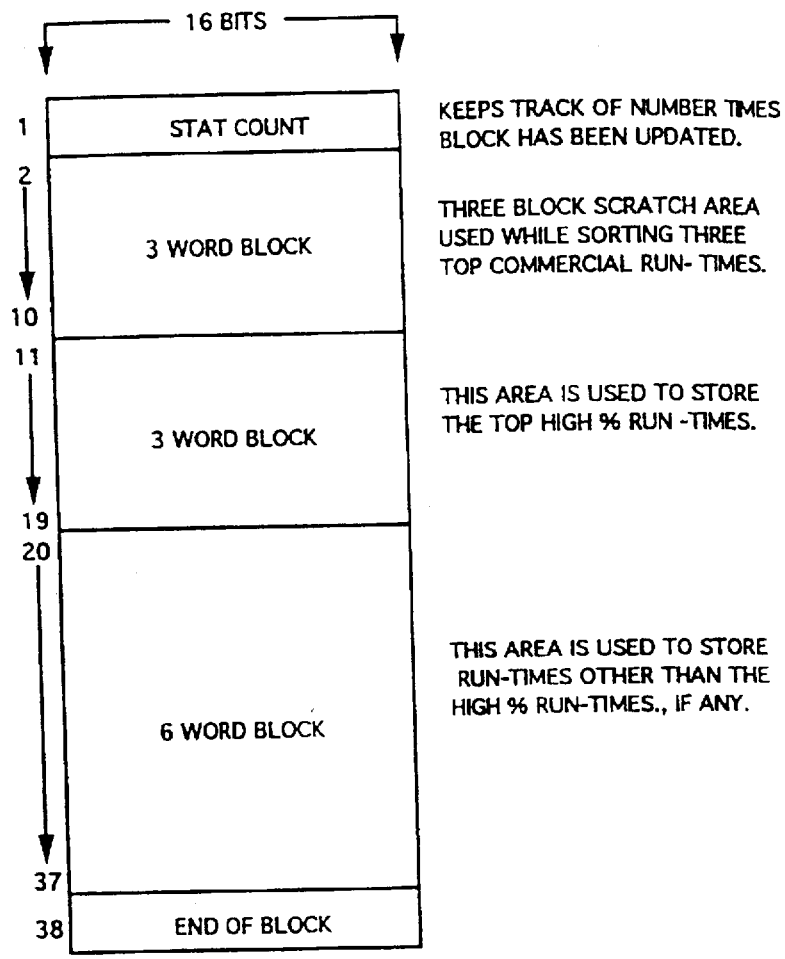
FIG. 10 depicts the organization of memory for storage of data relating to the historical and current run-times for an event type.
Figure 10:
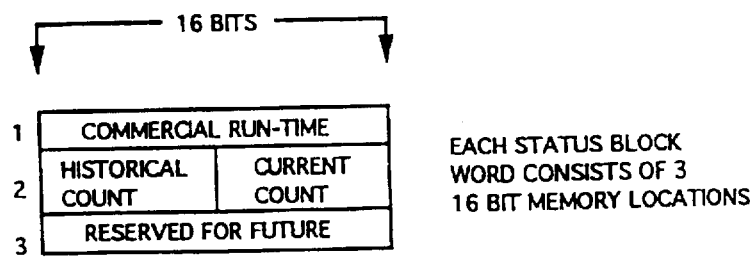

FIGS. 5 and 5a depict a flow diagram for the program executed by said Microprocessor 101. FIGS. 5 and 5a illustrate how the preferred embodiment of the invention is initialized. After a power-on reset, said Microprocessor 101 initializes said LCD Display 400, so as to enable said LCD display to be capable of displaying ASCII characters; which may be sent to it from said Microprocessor 101. Memory locations are set aside to act as variables that can be used by the various programmed entities to communicate and the said historical run-time blocks, depicted in FIG. 10, are initialized to a starting value by said Microprocessor 101. The initial values in said historical run-time blocks will be used until they are updated by the inventive device; as will be shown hereafter. After this initialization, said Microprocessor 101 uses LCD Display 110 to inform a user that infrared commands will need to be entered, and that questions will be asked which can be answered in the affirmative by activating any infrared sequence. Non-affirmative answers will be noted by the absence of any infrared activity from Receiver 107. In the preferred embodiment, a user is then instructed, via LCD 110, to input the VCR record command; from users VCR Infrared Remote Control 106.

Figure 6:
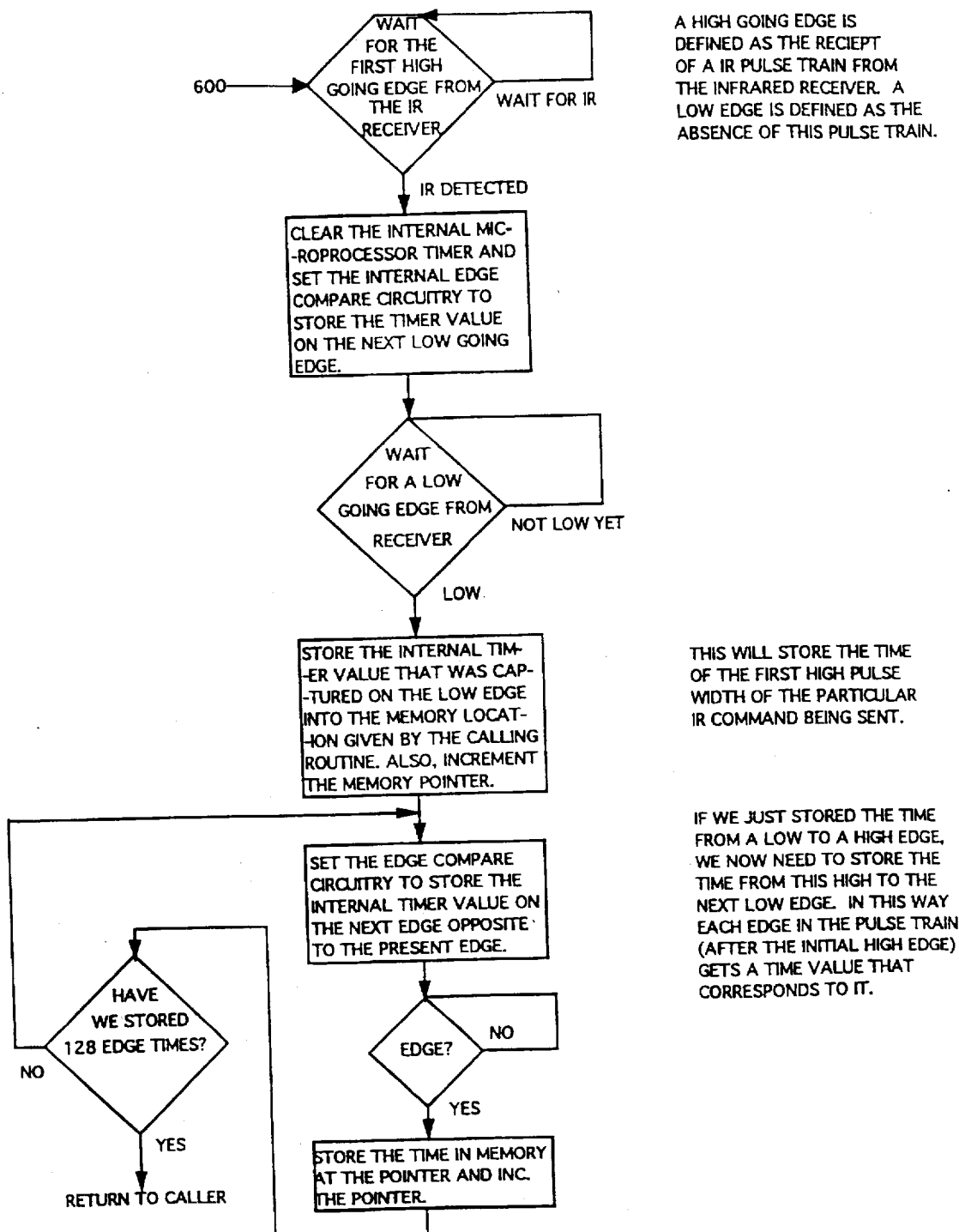
FIG. 6 depicts a flow diagram representing in more detail the steps taken to receive infrared commands during the programming steps.

FIG. 6 depicts the steps used in the preferred embodiment to receive the commands on the "record sequence" from a user. The input programming to said Second Port 149 of said Microprocessor 101 is examined to determine the values from said Infrared Receiver 107. When the leading edge of the infrared command sequence from said Remote Control 106 is detected by the change in the state of the output of said IR Receiver 107, a timing loop is started to determine the time until the trailing edge of the first infrared command pulse is detected. The time determined by the timing loop is stored in the first location of said Microprocessor's 101 memory reserved for the "record sequence." This step is repeated for the second pulse duration for the "record sequence" or until 64 pulses for a sequence have been received. At this point, LCD Display 110 indicates to a user that the programming of that command sequence has been completed. This technique is capable of recognizing any remote control command which uses Pulse Code Modulation.

Returning to FIG. 5, the same technique as was used to determine the desired commands for the "record sequence" is employed to determine the "Stop," "Pause" and "Rewind" sequences. Following the programming of these sequences by the user, the system instructs the user, via LCD Display 110, to turn VCR on and insert a recording tape so that the series of infrared command sequences previously entered can be verified by the user; this is done to verify command integrity.

Figure 9:
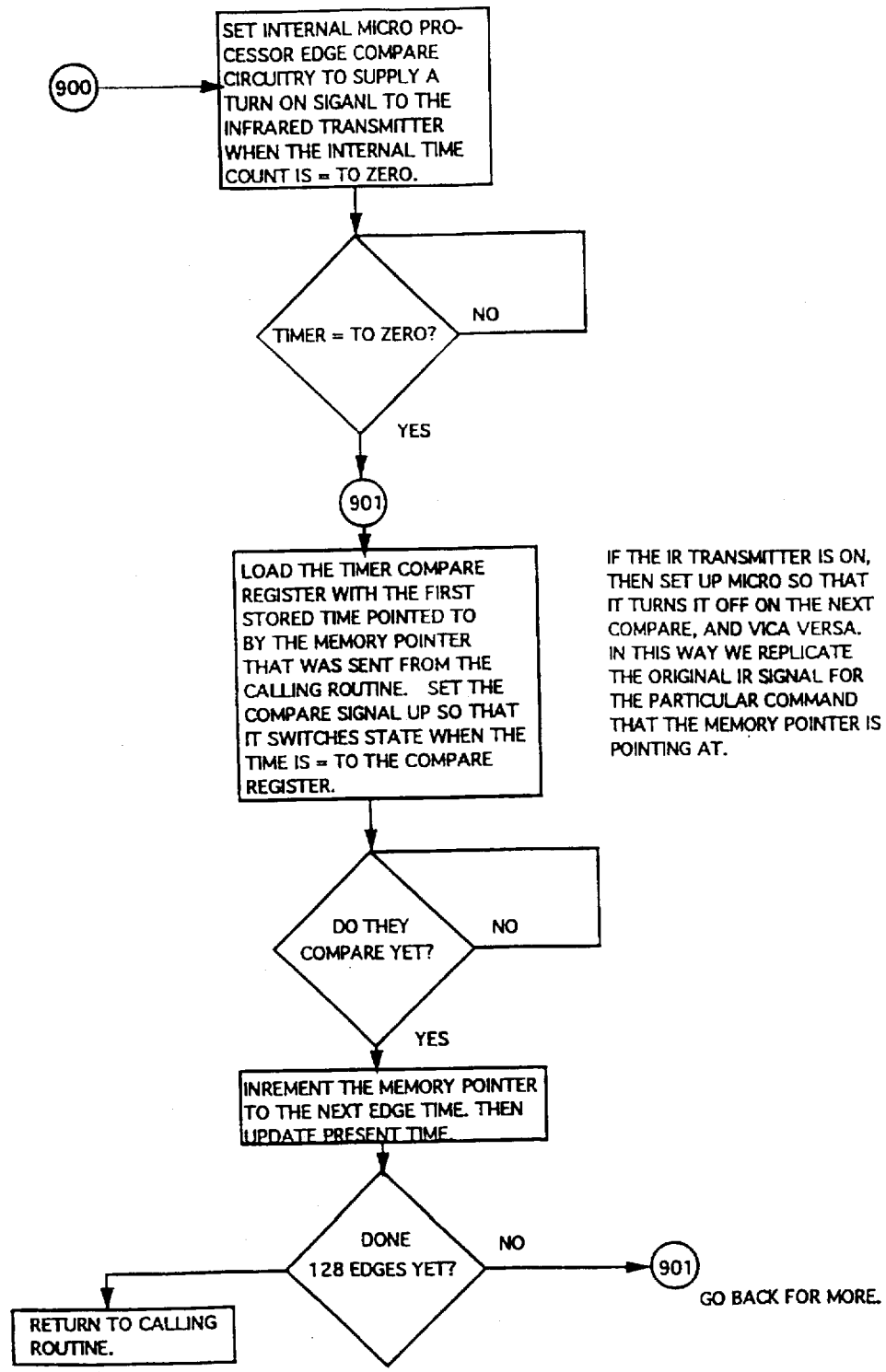
FIG. 9 is a flow diagram representing the steps taken to output a command sequence.

FIG. 9 depicts the steps used in the preferred embodiment to output a previously learned infrared command sequence. A flow chart depicting the sending of a "command sequence" is shown in FIG. 9. The first action taken is to send the commands previously programmed for "record sequence" using the procedure depicted in FIG. 9. That "record sequence" command sending procedure comprises the steps of commanding the output from said Second Port of said Microprocessor 101 to be either true or false for the periods previously determined during the initialization procedure. This will result in said infrared Transmitter 108 producing remote control commands to be received by said Controlled Device 109 which are a duplicate of the sequence of commands programmed during system initialization. Upon receipt of the signals from said Infrared Transmitter 108, said Controlled Device 109 will act as if those commands had been manually sent by the user from Remote Control Device 106.

Returning to FIG. 5a, the same technique used to send the "record sequence" is employed to send the "Stop," "Pause" and "Rewind" command sequences to the VCR in that order. A small wait delay is incorporated into the program to allow the VCR to settle from one command to the next. After the infrared command sequences are sent the user is then asked the question, via LCD Display 110: "Are all commands OK." To answer "yes" the user activates any IR command sequence to the inventive device. To answer "no" the user does nothing. If the user answers "no," the system will return to the Point 500, as depicted in FIG. 5, and ask the user to input the commands again; going through the whole program again as described above. If the user answers "yes," a location is set, by said Microprocessor 101, in memory, indicating that said command sequences have been successfully memorized. As long as power to the inventive device remains "on" uninterrupted, the above process of entering the infrared commands need not be repeated. In the preferred embodiment a battery backup power source is employed to guarantee power integrity to the device. At this point, the user is asked, via LCD Display 110, if user is ready to begin programming the inventive device to delete commercial messages from an event. If the user does not activate an infrared command sequence, the device will continue to display the above-mentioned question: "Ready to record?" until such time as user is ready. When the user indicates that the inventive device should continue, by activating an IR sequence, the user is asked, via LCD Display 110, what type of event commercial messages will be deleted from. The event types used in the preferred embodiment are: news, sports, movie, sitcom, drama and day program. These choices are continuously scrolled to the LCD Display 110 one at a time, until the user activates an IR sequence, at the same time the selected event is displayed. A number corresponding to this user selected event type is stored in an Event 1 position in memory by said Microprocessor 101 and is used as a pointer to the said historical run-times for this event type.

The user is then questioned as to the start time (AM or PM), day of the week and end time of the particular event to be recorded. These day and time related values are also stored in memory corresponding to the event number; in this case Number 1. It should be noted that the user is questioned after each selection category mentioned above as to the validity of the user's choice as it is displayed before the user, via LCD Display 110. If the user does not answer in the affirmative, by activating an IR sequence from Remote Control 106, the question is displayed again so user can reselect. At this point, the user is questioned, via LCD Display 110, whether "another event" will be programmed, i.e.: Event Number 2. If the user selects in the affirmative, via Remote Control 106, the same process of obtaining event type, start time and end time as mentioned above is repeated with the results stored in Event 2 related memory locations. For the second event, the broadcast station number of the event is also needed to change the VCR channel before recording begins. This is necessary because the user may want to record multiple events on different broadcast stations. The user is then asked to input the first broadcast station digit number, via Remote Control 106. The same process is repeated for the second broadcast station digit number. The commands are stored in memory, via the process in FIG. 6, at locations related to the event number; in this case 2. The stored commands are then output to the VCR as in FIG. 5a, as previously discussed, and the user is questioned concerning their validity. If not valid the user is asked to reenter the broadcast station numbers and the process is repeated until the IR commands are properly memorized by the inventive device. Event types three thru seven are obtained in exactly the same manner as discussed for Event 2. The user may skip past the above process, by not answering in the affirmative to the "another event?" question.

At this point, the inventive device has been initialized and programmed to delete commercial messages in up to seven different events. The user is then asked to enter the present time in the same manner as event start times were entered above. The present time and day is then stored in memory, via Microprocessor 101.

Figure 11A:
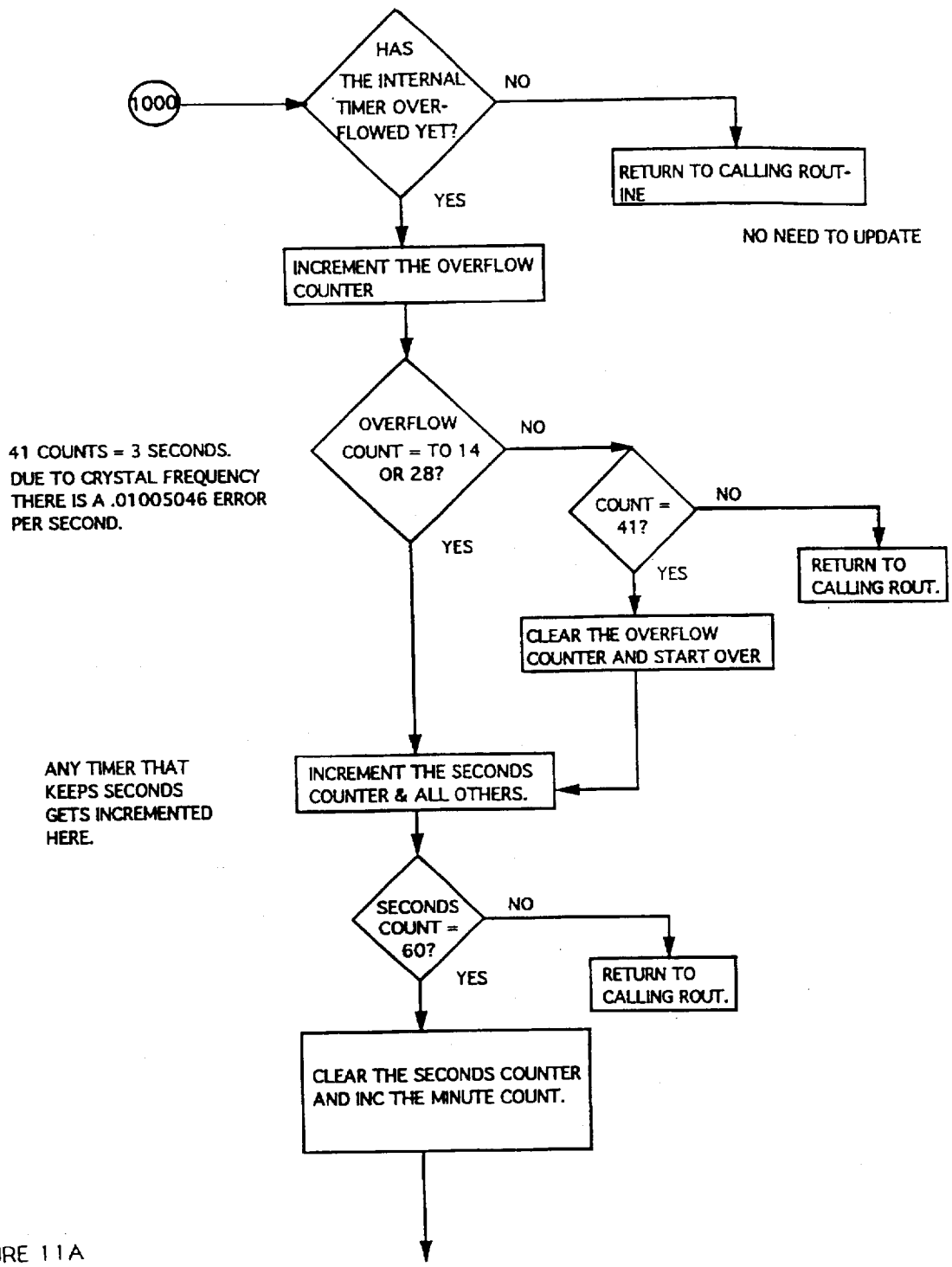
FIGS. 11A and 11B are flow diagram representing the steps taken to update and keep current the time of day and day of the week.
Figure 11B:
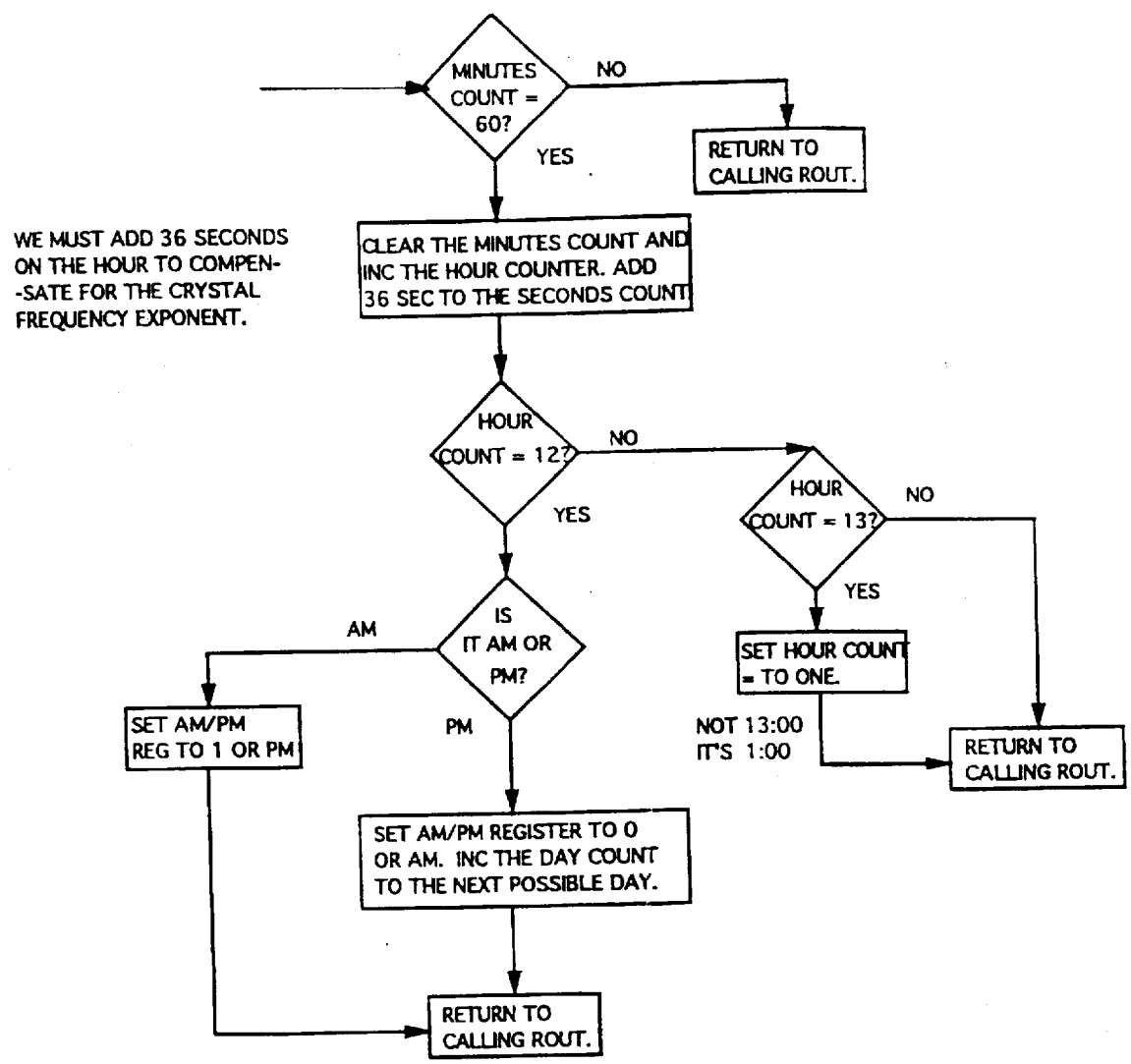

FIG. 11 depicts a flow chart showing the process employed to keep the present time updated. Said Microprocessor 101 incorporates an internal timer that is automatically incremented, at one-forth the crystal frequency used to drive said Microprocessor 101. Said internal timer, being 16 bits wide, overflows every 65,536 counts; setting an internal overflow flag which can be monitored by said Microprocessor 101. Due to the crystal frequency in the preferred embodiment, of 3.58 mega hertz, said internal timer overflows once every 73.40032 milliseconds. Because this value, 73.40032 milliseconds, is not an even divisor, a value of 41 internal timer overflows is chosen to represent a value of 3 seconds. This choice produces a real-time error of approximately minus 36 seconds per hour. To keep the time accurate 36 seconds is added to the seconds register, which resides in memory, on each increment of the hour register. Each time the said internal timer of said Microprocessor 101 overflows a memory register called "overflow" is incremented. Upon reaching the count of 14 or 28 the present time is incremented by 1 second. Each time the seconds are updated for the present time, various other timers, used by the system, are also updated. At the count of 41 the present time is incremented 1 second and the "overflow" register is cleared to begin counting again. In this way each 3 seconds of incrementation of present time corresponds to 41 overflows of the said internal timer of said Microprocessor 101. The seconds register, in memory, is then compared to 60. If it has not reached 60 no further action is taken and the system returns to its previous task. If the seconds register is equal to 60 then the minute register is incremented; thus incrementing present time by 1 minute. The minutes register, in memory, acts to increment the hours, and the hours register increments the days, etc. In this way the present time, entered previously be the user, is updated and kept accurate by said Microprocessor 101.

The present time is now compared to the start-time of the first event programmed by the user. When the event start time is equal to the updated present time the VCR is issued the previously memorized "record sequence" via Infrared Transmitter 108. Control is then transferred to the "on" portion of program.

Figure 7A:
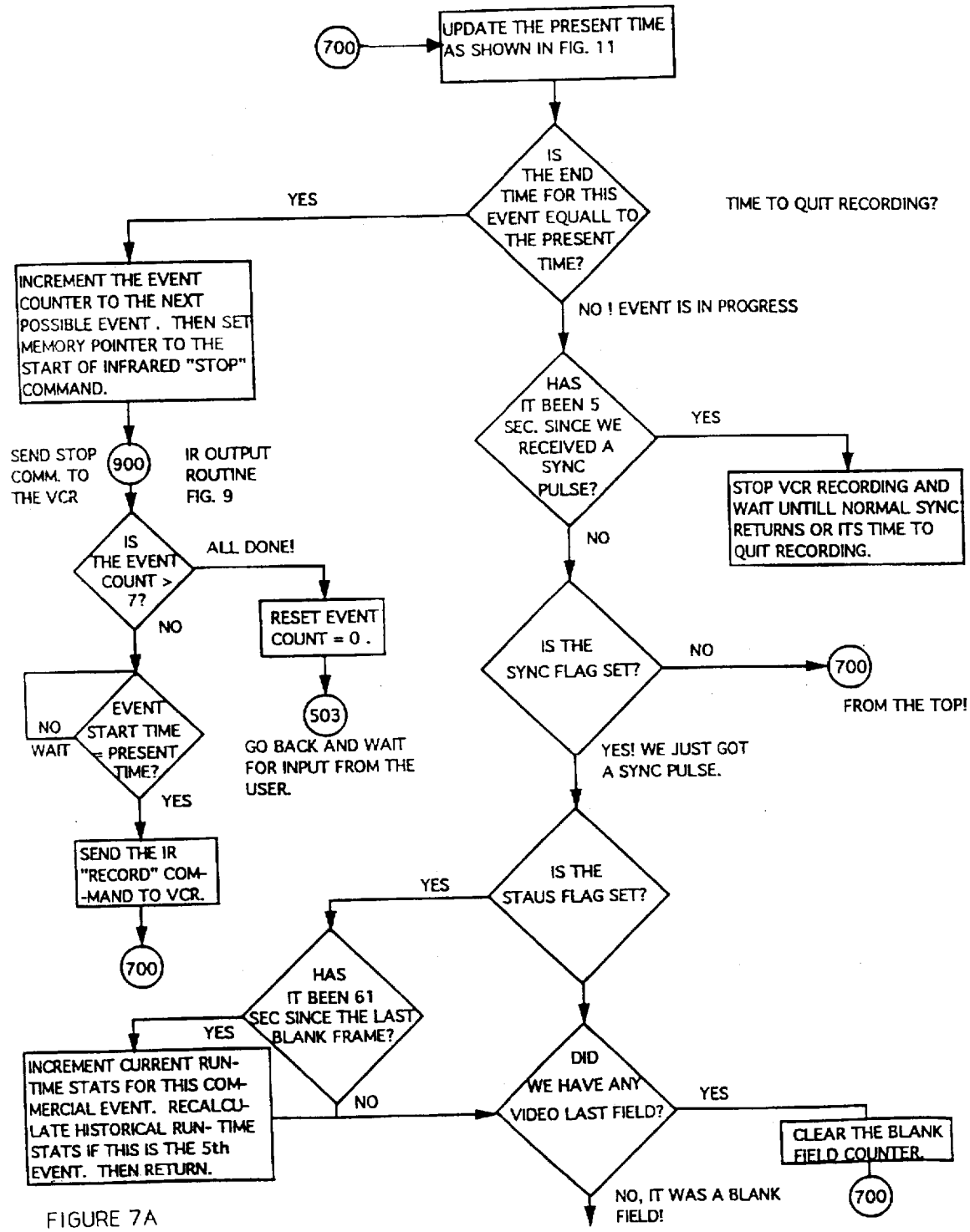
FIGS. 7A and 7B are flow diagrams representing the steps taken to detect the beginning of a commercial message and to output a programmed command sequence.
Figure 7B:
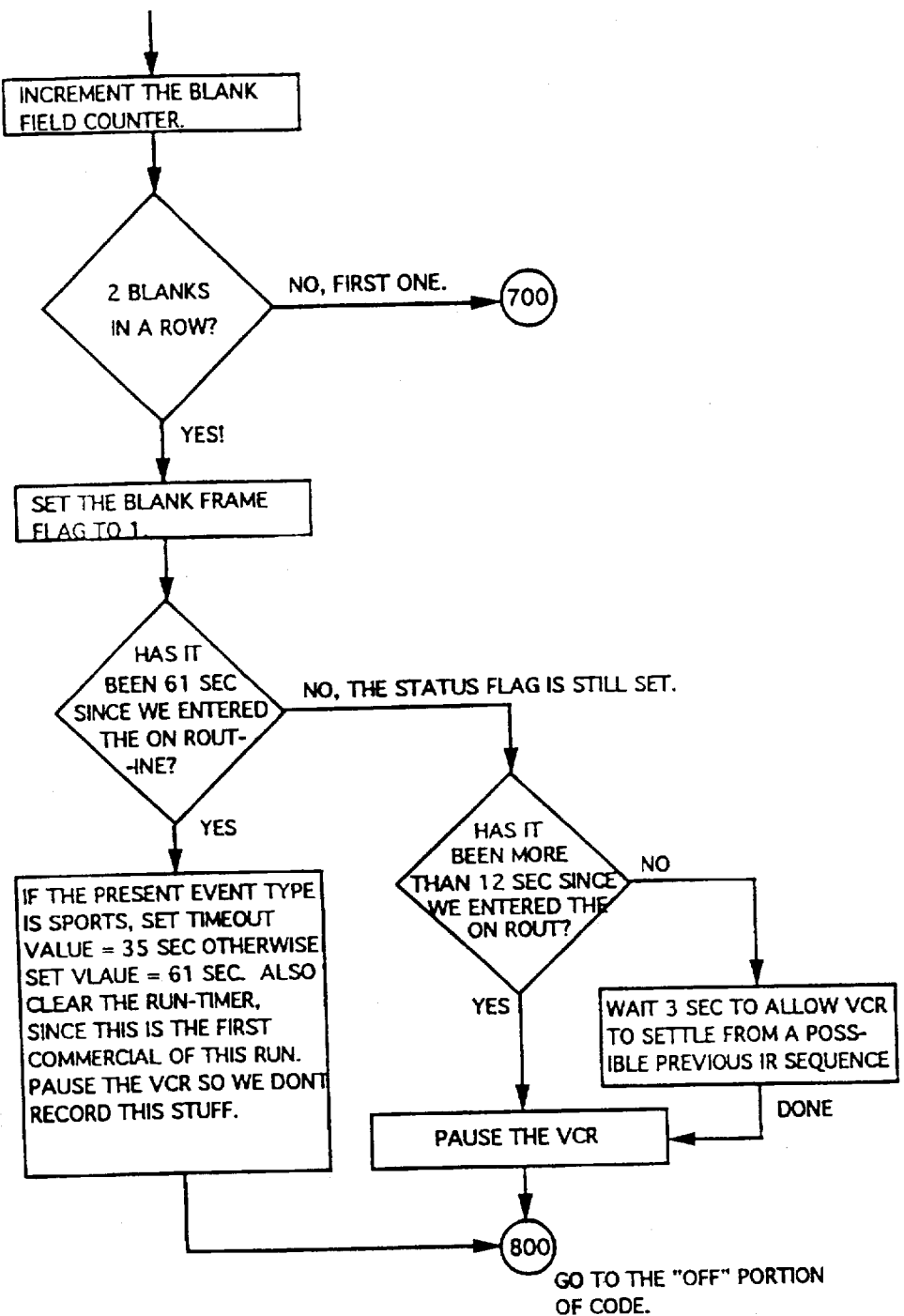

FIG. 7 depicts a flow chart which details the actions of the inventive device during the "unpaused" or "on" portions of the recording event. The main function of the "on" portion of the system program, is to continuously monitor the output value of said Video Detector 104, via a register in memory called "S video," to see if two consecutive "no-video" or blank fields occur during recording of said event. If two consecutive blank fields do occur, the VCR is put into "pause" mode, via Infrared Transmitter 108, with the previously memorized "pause sequence" and control is transferred to the "off" portion of the system program. Thus, two consecutive "no-video" fields may constitute the beginning of a commercial message and the VCR is paused in its recording.

Referring again to FIG. 7, the present time is updated by calling the appropriate code as detailed previously in FIG. 11. The updated present time is then compared to the end-time for the event number being recorded, i.e.: 1-7. If the times compare, meaning the event is over, the event number is incremented by 1, to the next possible event number not greater than 7, and the VCR is stopped recording by issuing the previously memorized "stop sequence" via IR Transmitter 108. The start time for this next event, if programmed by user previously, will then be compared to the updated present time, repeating the same steps as discussed above. If the next event, corresponding to the incremented counter, has not been programmed by the user, the VCR is issued a "rewind sequence" and the whole process starts again by asking the user, via LCD Display 110, if user is "ready to record" more events. The inventive device will stay at this point until the user answers in the affirmative, via Remote Control 106. Continuing on with FIG. 7, if the event end time does not compare to the present time, i.e., it's not time to stop recording, then a vertical sync "watchdog timer," in memory, is examined by the program. This "watchdog timer" is incremented by the timer portion of the program, as previously discussed in FIG. 11 and it is automatically cleared to zero upon the receipt of a vertical sync pulse from Sync Detector 105 to 150 of said Microprocessor 101. In this way, the watchdog timer is allowed to continue incrementing upward only if no vertical pulses are received at 150 of said Microprocessor 101 each second. If said "watchdog timer" reaches the count of five, meaning no sync pulse has occurred within five seconds, then the VCR is stopped recording, via the previously memorized "stop sequence." Recall, from the previous discussion of Sync Detector 105, that video signal loss is automatically monitored through the Sync Detector 105 Output to Port 1 148 of said Microprocessor 101. The sync "watchdog timer" then is a second means of detecting an abnormal video signal being received by the inventive device. In this second case, the video signal is present, but contains abnormal syncing pulses, meaning the video being recorded is of poor quality. Thus the user is insured, that a loss, or poor quality of video broadcast will not be recorded on video tape by said VCR. While the VCR is stopped recording, due to either poor signal quality or loss of video signal, the present time is continuously updated and the end time for the particular event being recorded is compared to it; in case the user programmed end time comes while in this state. The end of the event will be handled as previously discussed, i.e., event number incremented, etc. After video signal quality is insured a "sync flag" register, in memory, is examined for a value of 1, indicating that a sync pulse has been received. If no sync has been received, program execution is returned to the top of the "on" program and the process repeats again as discussed thus far. If the "sync flag" is equal to 1 then execution continues. The "sync flag" register is automatically set upon the receipt of a valid sync pulse from Sync Detector 105 to IRQ1 Interrupt 150 of said Microprocessor 101. Upon the receipt of this pulse Microprocessor 101 is programmed to wait for 1500 micro seconds; this allows the video signal to proceed past the vertical sync and station call lines to approximately horizontal video line number twenty. The interrupt program then sets the "sync flag" to 1, stores the value from Video Detector 104 to the "S video" register, in memory, clears the sync "watchdog timer" to zero, resets the Video Detector 104 and guarantees that the video signal is valid, as discussed previously. The program then returns control to the program that had control before the sync pulse occurred at 150 of said Microprocessor 101. Continuing with FIG. 7, upon receipt of sync, the value of the "status flag" register, in memory, is examined. This "status flag" register is set to a value of 1 by the "off" portion of programming just before control switches from the "off" to the "on" portion of programming. This "status flag" then, if set, represents the fact, that the "off" portion of programming has made the decision that commercial messages are over and that recording is to resume. If this "status flag" has been present for 61 seconds and no blank frames have occurred during this time, then the historical run-time blocks are updated with the stored commercial run-time gathered by the "off" portion of programming. 61 seconds corresponds to 1 second longer than the longest anticipated commercial run-time. If this time is reached the device can be positive that the decision made by the "off" program was valid and the historical statistics can be updated properly. The historical run-time statistics are updated by comparing the above-mentioned commercial run-time with the values stored in the "high percentage" and "free space" sections of memory set aside for the particular event type being recorded. Referring to FIG. 10, if the commercial run-time value is within 16 seconds of any stored value, then that stored values current count is incremented by one. If no match, within 16, is found, the new commercial run-time value is stored as a block word, as depicted in FIG. 10, and its current count is set to one. At this point the "stat count" is incremented by one and then compared to the value of five. If the "stat count" word is equal to five, meaning this is the fifth commercial run processed, then the current counts are added to the historical counts for each run-time stored; the result being stored in the historical count. The current count is then cleared to zero and the new historical count is divided by two to obtain an average. This average then represents the average number of times in five, that a particular commercial run-time occurs. Up to three, of the highest average run-times, are then stored in the "high percentage" area of memory, for this event type and all other run-time values are cleared. The "stat count" is then cleared to read zero and the "status flag" is set to zero, indicating that the historical run-time blocks have been updated with the last commercial run-time. Program execution in the "on" portion of code then continues. The value of the "S video" register is then examined. If the value indicates that video was present, in the previous field, then a blank field register, in memory, is cleared to zero and program execution returns to the start of "on" again. If the value indicates that video was not present, the previous field, then the blank field register is incremented by one. If the blank field register is equal to two, then the blank frame register, in memory, is given the value of one, indicating that a blank frame has been detected, and execution continues. Otherwise, program execution is returned to the start of the "on" portion of programming. If a blank frame has been detected, the value of the "status flag" is examined. If the "status flag" is equal to zero, a timeout register, in memory, is set to the value of 35 seconds. If the event type is sports, or 61 seconds if not a sport type event. The commercial run-time is then set to zero, indicating a new run is starting, and the infrared "pause sequence" is issued to the VCR via Transmitter 108. Program control is then switched to the "off" portion of programming. If the value of the "status flag" is set, meaning it has not been 61 seconds since the last blank frame and the commercial run is still in progress, the amount of time since the "status flag" was set by the "off" program is determined. If the time since the "status flag" was set by the "off" program is less than 12 seconds, 1 3 second wait loop is entered. This is necessary, to insure that the VCR is not still responding to the unpause or sequence just sent to it by the "off" program, before giving control to the "on" program. If the "pause sequence" is sent, due to the blank frame, while the VCR is still responding to the before mentioned unpause command, the "pause sequence" will be ignored by said VCR. Once the 3 second loop is completed the IR "pause sequence" is issued to the VCR, via Transmitter 108, and control is switched to the "off" portion of programming with the run-time still intact. The commercial run-time then, is only cleared if it is a new run. Otherwise, it is not a new run and the run-time continues to accumulate. In this way, valid run-times are insured.

Figure 8A:
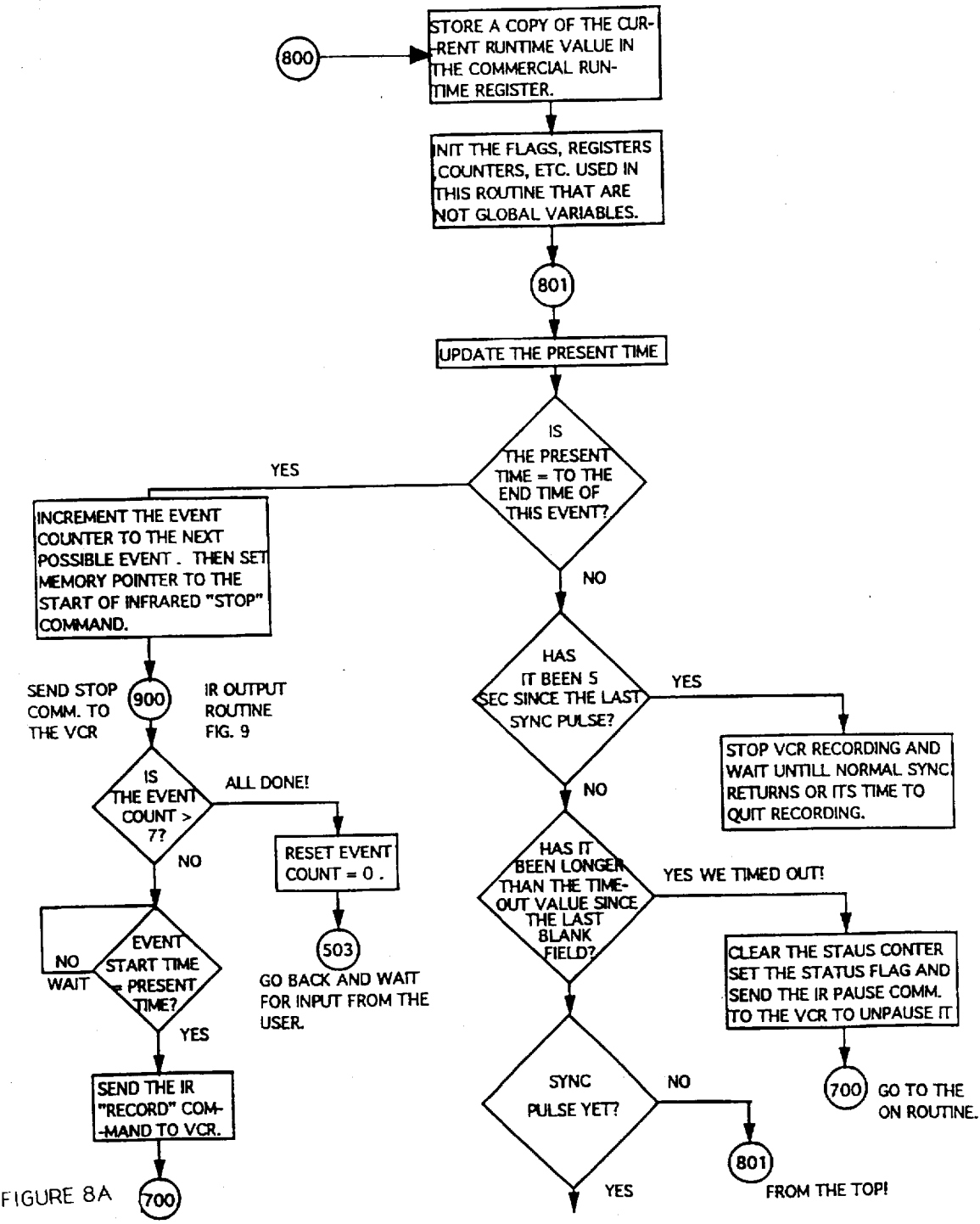
FIGS. 8A–8C are flow diagrams representing the steps taken at the end of a commercial message to output a programmed command sequence.
Figure 8B:
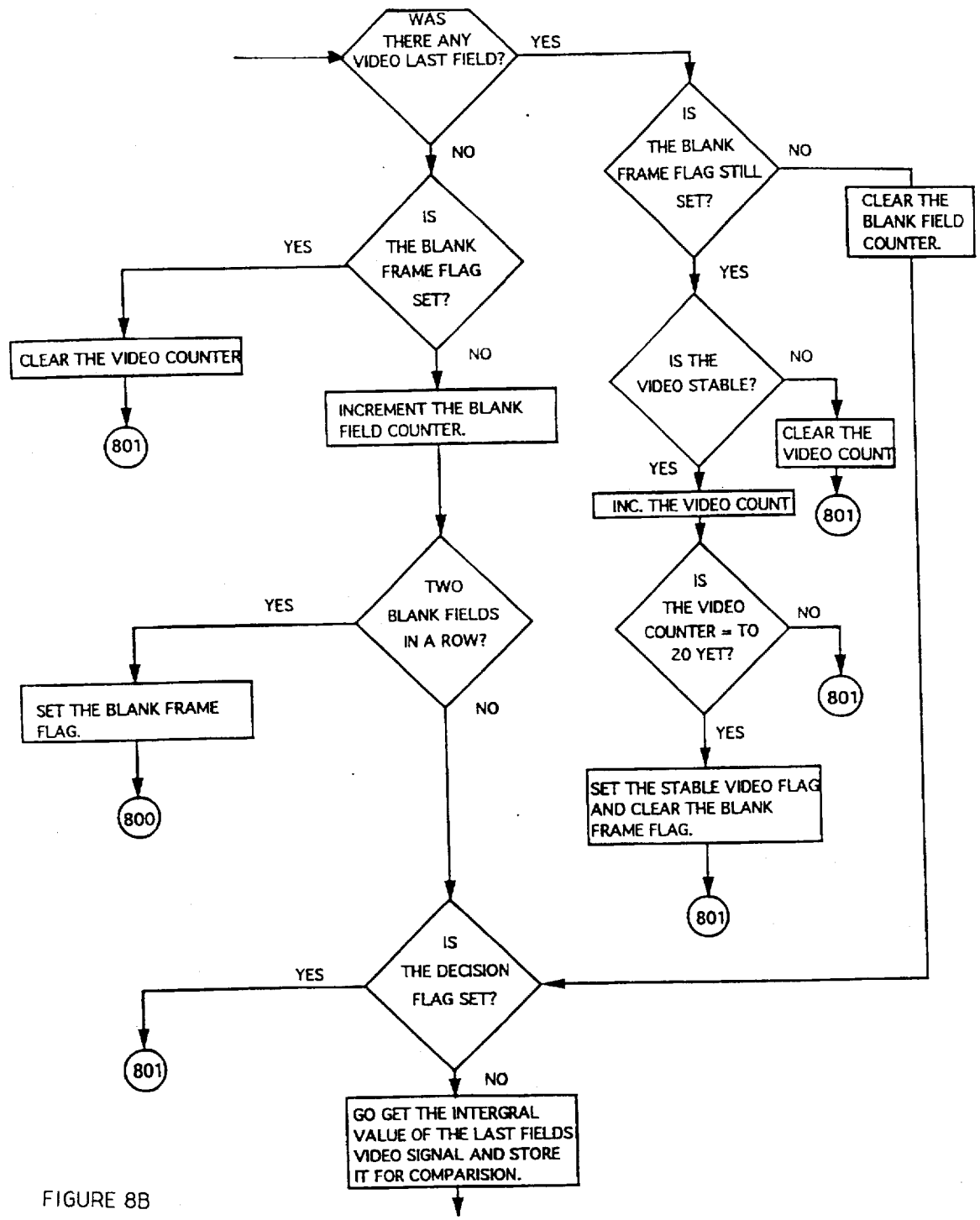
Figure 8C:
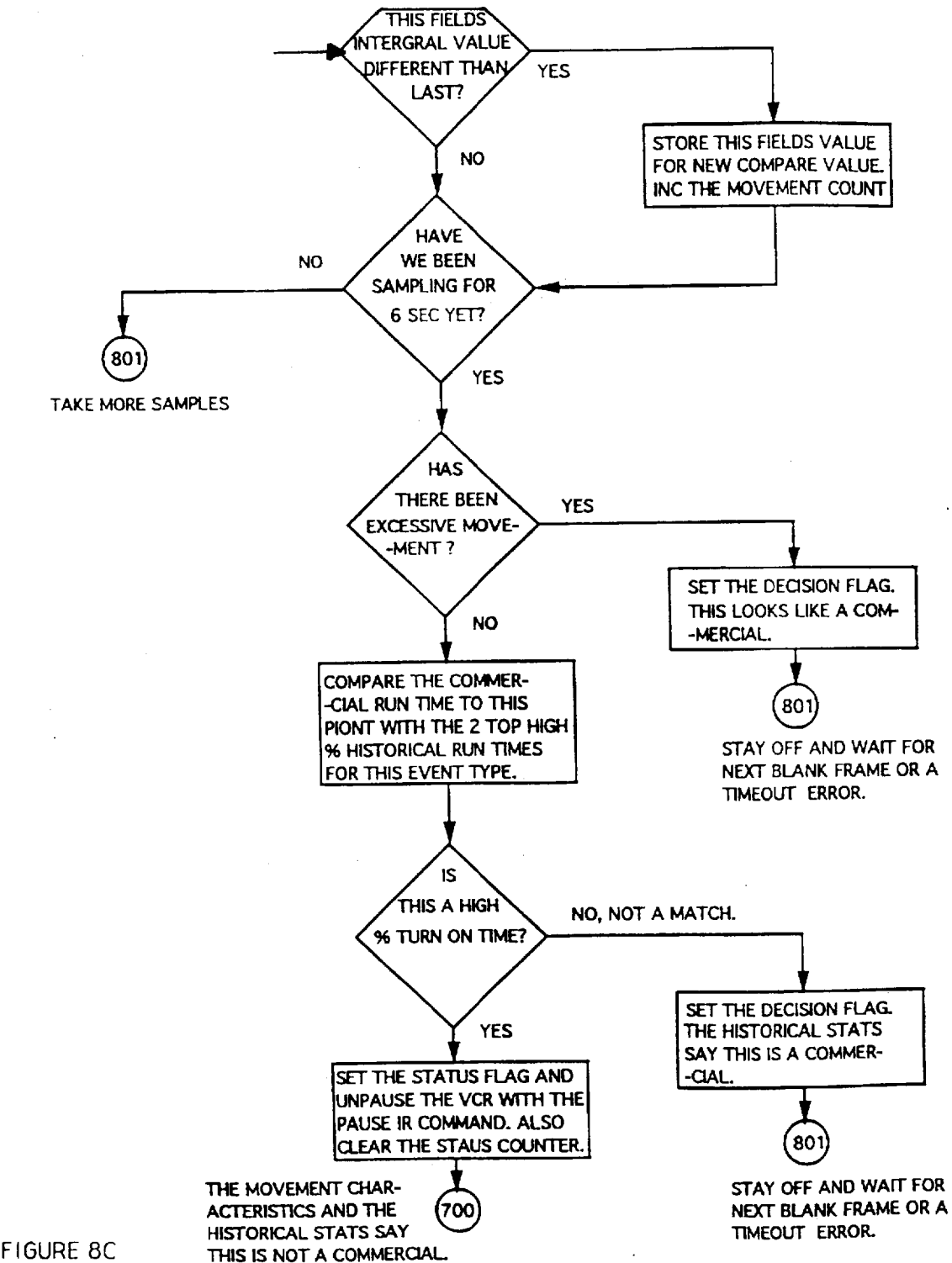

FIG. 8 depicts a flow chart showing the operation of the "off" portion of programming. This portion is entered, or given control, when the VCR has been paused by the "on" program. The main function of the "off" program, is to wait for video to return and become stable after a blank frame is detected, and then to sample that video signal for six seconds via Analog to Digital Sampler 112. If the integrated value of the video signal, which is sampled each field, remains within a 140 millivolt tolerance for the 6 seconds, then the first two high percentage historical run-times for the event type are compared to the run-time corresponding to the beginning of this suspected commercial message. If the commercial run-time for the start of this suspected commercial is within a value of 16 seconds of one of the two high percentage run-times, then a "pause sequence," which serves to unpause the VCR is issued, the "status flag" is set to one and control switches to the "on" program. If the video signal does not stay within a 140 millivolt tolerance for six seconds, or the start of this suspected commercial message, in commercial run-time, is not within 16 seconds of the first two high percentage historical run-times, then a "made decision" register is set to 1 and the program goes back to waiting for the next blank frame or a timeout to occur. In other words, the VCR remains in a paused condition. Referring to FIG. 8, each time a blank frame is detected, meaning two consecutive blank fields, or the "off" program is entered from the "on" program, the timeout timer is cleared and the current value of run-time is stored in a commercial time register, in memory. This commercial run-time value is equal to zero as the first commercial message starts. This first message would then end, say 30 seconds later, and a blank frame would then separate this first commercial message from the beginning of the possible second commercial message. This blank frame causes the run-time, which is now equal to 30 seconds, to be stored in the commercial time register. If this second message was not a commercial, but valid program video, a next blank frame for this commercial run would not occur. This would leave the commercial time register equal to 30 seconds, which, in this case, was the actual commercial run-time. In this way, the commercial time register always contains the actual value of commercial run-time. This commercial time value is the run-time value used to update the historical run-time statistics, as previously discussed. Present time updating, user programmed event end time monitoring, signal loss, sync and blank frame detection are all handled as previously discussed in the "on" portion of programming. A timeout timer, in memory, is allowed to count up, it being updated each second along with present time, between blank frames. The value of this timeout timer is constantly compared to the timeout value set in the "on" program, as previously discussed. If the values ever compare, it signifies that the time between blank frames is excessive, indicating that an erroneous decision may have been made in the judgment between commercial and event type video. The VCR is then issued an IR "pause sequence" via Transmitter 108, which serves to unpause the VCR, and control is returned to the "on" program. In this way the effect of an errant decision on the loss of wanted recording is minimized. Stable video is arrived at, after a blank frame, when 20 consecutive fields have been received with a video signal integral value within 160 millivolts. The switching of control between the "off" and "on" programs continues until the user programmed event end time is reached. At this time, as previously discussed the event count is incremented and the user is asked via LCD Display 110, to program events.

It is to be understood that the above-described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of the invention.

I claim:

1. A system for automatically producing infrared remote control signals comprising:

a. a start means for determining the start of a commercial message;

wherein said start means, connected to a clamped video signal, determines the presence of video information by using a variable serration sampled black level bias signal, a comparator and a microprocessor enabled detector; and b. an end means for determining the end of said commercial message;

wherein said end means, connected to said clamped video signal, samples said clamped video signal to determine the average scene content stability over a fixed time interval; the information of said scene content is then combined with continuously updated historical commercial data and other user defined variables to determine the end of a commercial message; and c. a signal processing means for receiving and storing user activated infrared signals; and wherein user said signal processing means receives and interprets user activated infrared signals received as user responses to communications sent to the user by a communication means; and wherein said signal processing means produces a first user-specified sequence of infrared remote control signals whenever said start means determines that said commercial message has started; and wherein said signal processing means produces a second user-specified sequence of infrared remote control signals whenever said end means determines that a commercial message has ended; and said communication means receives and transmits standard RS232 signals; and wherein said communication means uses said RS232 signals to communicate with the user through a display device.

2. A system as in claim 1 wherein said start means comprises:

a. a trigger means to signify the presence of composite video information;

wherein said trigger means is made to be enabled only for a variable duration of time each video field; and wherein said trigger means is triggered by the presence of a signal value at the input of said trigger means input; and b. said comparator means wherein a composite video signal can be continuously compared to the variable bias level signal; and wherein said compare means provides an appropriate signal value so as to trigger said trigger means if the composite video signal level is greater than the variable bias level; and c. said variable bias means;

wherein said variable bias means receives said composite video signal; and wherein said variable bias means is made to turn on only during the vertical sync serration portion of the composite video signal; and wherein said variable bias means stores the sum of the peak value of the vertical sync serration portion of the composite video signal and a user adjustable value; and wherein said variable bias means provides a variable bias signal to said comparator.

3. A system as in claim 1 wherein said end means comprises a dynamic broadcast signal sampling, a statistical decision process and an internal microprocessor controlled timing process.

4. A system as in claim 3 wherein said signal broadcast sampling is adapted to a continuously updated integral of the broadcast signal.

5. A system as in claim 3 therein said statistical decision process is adapted to a continuously updated list of commercial message continuation times.

6. A system as in claim 3 wherein said internal microprocessor controlled timing process is adapted to expire after a variable time.

7. A system as in claim 1 further comprising loss means for determining the complete and continuous loss of a composite video input signal to said system;

wherein said loss means is activated by the complete loss of vertical sync pulses for a continuous, variable, length of time; and wherein said loss means is deactivated upon the continuous resumption of vertical sync pulses for a variable length of time.

8. A system as in claim 7 wherein said signal processing means produces a user-specified sequence of infrared signals whenever said loss means determines a loss of video input to said system; and wherein said signal means produces a fourth sequence of user-specific infrared remote control signals whenever said loss means determines the resumption of video input to said system.

9. A system as in claim 1 wherein said signal processing means comprises:

a. a receiving means for receiving said infrared signals; and b. transmitting means for transmitting said infrared signals; and c. a storage means for storing said infrared signals.

10. A system as in claim 9 wherein said transmitting means is adapted to generate infrared signals that are identical to those received from a conventional infrared control device capable of controlling an apparatus.

* * * * *